Patented Feb. 26, 1935

1,992,695

UNITED STATES PATENT OFFICE 1,992,695

METALLIC PAINT

Thomas C. Ford, Kankakee, Ill., assignor to American Asphalt Paint Co., a corporation of Illinois No Drawing. Application January 15, 1932, Serial No. 586,960

5 Claims. (Cl. 134—51)

This invention relates to a paint whose pigment is a light colored metal powder, and to a method of preparing the same.

One of the difficulties heretofore encountered with such paints and particularly aluminum paints is their tendency to streak. By means of this invention a smooth coating is produced, while at the same time a minimum quantity of the metal is required.

In accordance with this invention an asphalt vehicle is prepared by mixing uintahite, which is known commercially as "Gilsonite" with linseed oil in the proportion of about 65% uintahite to 35% linseed oil and the mixture is digested at 400 to 425° F. for 12 to 15 hours, thereby fluxing the uintahite with the linseed oil. The mixture is then cooled and reduced to a brushing consistency—i. e., a viscosity of approximately 50—by adding mineral spirit (48 to 50° Bé. naphtha). In general this requires the addition of about 51 to 53% naphtha based upon the total composition of the uintahite and naphtha mixture.

A varnish portion of the paint may then be prepared by heating together about 8.8 parts of linseed oil with 11.5 parts of an ester gum and about 26.2 parts of China-wood oil until a temperature of approximately 525° F. is reached, and the mixture is then held at this temperature until a liquid of the desired body is obtained, say for about one or two hours. About .5 parts of a metallic dryer such as lead, manganese or cobalt linoleate is then added. The mixture is then cooled to about 375° F. and about 53 parts of a thinner, preferably 48 to 50° Bé. naphtha, is added to reduce the varnish to a viscosity of about 50.

The asphalt and varnish portions may then be mixed. Where it is desired to produce a paint for spraying, the proportions are about 25% asphalt to 75% varnish, whereas where a brushing paint is desired, from 5 to 10% of the asphalt portion is used with 90 to 95% of the varnish.

A metallic bronzing pigment, such as flaky aluminum, is added in the proportion of about 1.2 pounds of aluminum powder per gallon. It is preferred to add the aluminum in the form of a paste rather than a powder. About 2 pounds of aluminum paste per gallon of vehicle is added.

The aluminum paste may be made by intimately mixing flaky aluminum powder with heavy petroleum naphtha and stearic acid in the proportions of approximately 60% of the aluminum powder, to approximately 39% of 48 to 50° Bé. naphtha, and approximately 1% of stearic acid, the latter serving as a polishing agent.

By means of the aluminum paste it is possible to achieve a lighter color with the same amount of aluminum than with the powder. The paste apparently enhances the leafing quality of the metal, that is, the capacity of the aluminum particles to float on the surface and form a leaf-like layer upon the surface of the asphalt base.

Other synthetic resins may be used in place of the ester gum, as for example a phenol-formaldehyde condensation product such as "Bakelite". In preparing a paint comprising "Bakelite", a slightly different procedure may be followed, however. The asphalt vehicle may be prepared by mixing 25 parts of uintahite, 15 of "Bakelite" and 20 of China-wood oil, and 40 parts of linseed oil. These ingredients are heated to about 525° F. and held at this temperature for 10 or 20 minutes, or until an asphalt base of the desired body is obtained. The mixture is then cooled to 400° F. and thinned with approximately an equal amount of mineral spirits, or until a liquid of the desired viscosity is formed. A varnish portion is then prepared by heating approximately 18.7 parts of linseed oil, 55.8 parts of China-wood oil, and 24.5 parts of ester gum in the manner heretofore described in connection with the ester gum paint, and 1% of a metallic dryer added and thoroughly mixed with the liquid to form a varnish base. Mineral spirits is then added to produce a liquid of the desired viscosity, the usual proportion being 47% of the varnish base and 53% of mineral spirits.

The asphalt portion and the varnish portion are then mixed in about equal quantities. The "Bakelite" used is a solid product known as "Bakelite" XR—1330. Similar "Bakelites", for example, XR—820 or XR—821 or XR—302 may likewise be used. The aluminum powder or paste is then incorporated in the proportion of about 1.2 pounds of the powder to a gallon of the paint or about 2 pounds of the paste for the same amount. For a spraying paint correspondingly more of the asphalt portion is used, say 75%

The following are specific examples of paints produced according to this process.

|  | A | B |
|---|---|---|
|  | Percent | Percent |
| Uintahite | 1.645 | 6.223 |
| Linseed oil | 13.16 | 14.406 |
| China-wood oil | 22.09 | 18.277 |
| Ester gum | 9.635 | 6.027 |
| Cobalt linoleate | .47 |  |
| Mineral spirit | 53.00 | 51.00 |
| "Bakelite" |  | 3.675 |
| Lead linoleate |  | .392 |
|  | 100.00 | 100.00 |

1.2 pounds of aluminum powder or 2 pounds of aluminum paste per gallon of the above, in each case.

The proportions of the ingredients may be varied according to the brilliancy of the finish desired and the manner in which the paint is to be applied. For example, where the paint is sprayed, the uintahite proportion of the vehicle may be materially greater than where the paint is to be brushed on, and yet will produce a finish of equivalent brilliancy.

The viscosities set forth herein are all measured on the MacMichaels scale using the large disc bulb at a temperature of 25° C.

The foregoing detailed description has been given for clearness of understanding only, and no unnecessary limitations should be understood therefrom, but the appended claims should be construed as broadly as permissible, in view of the prior art.

I claim:

1. A paint composition comprising: a vehicle containing 1.5 to 8 parts of uintahite, 9 to 11 parts of linseed oil, 19 to 25 parts of China-wood oil, 8.5 to 11 parts of ester gum, .3 to .5 parts of a metallic dryer, and 50 to 60 parts of mineral spirits; and powdered aluminum.

2. A metallic paint comprising: a vehicle containing 6 to 10 parts of uintahite, 14 to 17.5 parts of linseed oil, 14 to 20 parts of China-wood oil, 3.5 to 6 parts of a solid phenol-formaldehyde resin, 3 to 6.5 parts of an ester gum, .1 to .4 parts of a metallic dryer and 50 to 60 parts of mineral spirits; and powdered aluminum.

3. A bronzing paint of the leafing type comprising: uintahite, a varnish, a drying oil, a volatile thinner, the uintahite constituting approximately 3.5 to 19.0% of the film-forming portions thereof, and a powdered metallic bronzing pigment.

4. A paint as set forth in claim 3, in which the pigment is aluminum.

5. A bronzing paint of leafing type comprising a vehicle containing 1.5 to 10 parts of uintahite, 9 to 17.5 parts of linseed oil, 14 to 25 parts of China-wood oil, 3.5 to 11 parts of a synthetic resin, a thinner therefor, and powdered aluminum.

THOMAS C. FORD.